(12) United States Patent
Freier et al.

(10) Patent No.: US 9,353,930 B2
(45) Date of Patent: May 31, 2016

(54) LIGHT DUCT TEE EXTRACTOR

(75) Inventors: David G. Freier, Saint Paul, MN (US);
Thomas R. J. Corrigan, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 2 days.

(21) Appl. No.: 14/009,133

(22) PCT Filed: Mar. 27, 2012

(86) PCT No.: PCT/US2012/030674
§ 371 (c)(1),
(2), (4) Date: Oct. 1, 2013

(87) PCT Pub. No.: WO2012/138503
PCT Pub. Date: Oct. 11, 2012

(65) Prior Publication Data
US 2014/0153256 A1    Jun. 5, 2014

Related U.S. Application Data

(60) Provisional application No. 61/473,220, filed on Apr. 8, 2011.

(51) Int. Cl.
| | | |
|---|---|---|
| *F21V 7/00* | (2006.01) | |
| *F21V 7/05* | (2006.01) | |
| *F21S 11/00* | (2006.01) | |
| *G02B 27/14* | (2006.01) | |

(Continued)

(52) U.S. Cl.
CPC ............... *F21V 7/05* (2013.01); *F21S 11/007* (2013.01); *G02B 6/0096* (2013.01); *G02B 27/14* (2013.01); *F21V 2200/40* (2015.01); *G02B 6/0018* (2013.01); *G02B 6/2817* (2013.01)

(58) Field of Classification Search
CPC .. G02B 6/12004; G02B 6/0036; G02B 27/14; G02B 6/0096; G02B 6/002; G02B 6/0031; G02B 6/0055; F21V 2008/008; F21V 7/00; F21S 11/00; F21S 11/007; Y02B 20/00
USPC .......................................... 362/341; 359/618
See application file for complete search history.

(56) References Cited

U.S. PATENT DOCUMENTS

| | | | |
|---|---|---|---|
| 247,229 A | 9/1881 | Wheeler | |
| 1,837,091 A | 12/1931 | Adams | |
| 3,715,596 A * | 2/1973 | DeMent | ........................ 250/253 |

(Continued)

FOREIGN PATENT DOCUMENTS

| | | |
|---|---|---|
| DE | 19936187 | 2/2001 |
| JP | 08-064019 | 3/1996 |

(Continued)

OTHER PUBLICATIONS

International Search Report for PCT International Application No. PCT/US2012/030674, Mailed on Oct. 18, 2012, 3 pages.

*Primary Examiner* — Evan Dzierzynski
*Assistant Examiner* — Matthew Peerce
(74) *Attorney, Agent, or Firm* — Yen T. Florczak

(57) ABSTRACT

The disclosure generally relates to highly efficient light duct light extractors that are capable of extracting a portion of the light propagating within a light duct with nearly 100 percent efficiency. In particular, the described light extractors are configured in a "Tee" shape with a reflective diverter element.

14 Claims, 5 Drawing Sheets

(51) Int. Cl.
  *F21V 8/00* (2006.01)
  *G02B 6/28* (2006.01)

(56) References Cited

U.S. PATENT DOCUMENTS

| | | | |
|---|---|---|---|
| 4,152,752 A | 5/1979 | Niemi | |
| 4,173,390 A | 11/1979 | Kach | |
| 4,411,490 A | 10/1983 | Daniel | |
| 5,103,337 A | 4/1992 | Schrenk | |
| 5,117,478 A * | 5/1992 | Cobb et al. | 385/133 |
| 5,151,825 A | 9/1992 | Nicolas | |
| 5,360,659 A | 11/1994 | Arends | |
| 5,389,324 A | 2/1995 | Lewis | |
| 5,654,827 A | 8/1997 | Reichert | |
| 5,882,774 A | 3/1999 | Jonza | |
| 5,988,843 A | 11/1999 | Handel | |
| 6,045,894 A | 4/2000 | Jonza | |
| 6,149,289 A * | 11/2000 | Kuramitsu et al. | 362/551 |
| 6,157,490 A | 12/2000 | Wheatley | |
| 6,179,948 B1 | 1/2001 | Merrill | |
| 6,207,260 B1 | 3/2001 | Wheatley | |
| 6,353,503 B1 | 3/2002 | Spitzer | |
| 6,368,699 B1 | 4/2002 | Gilbert | |
| 6,486,997 B1 | 11/2002 | Bruzzone | |
| 6,531,230 B1 | 3/2003 | Weber | |
| 6,783,349 B2 | 8/2004 | Neavin | |
| 6,814,896 B2 | 11/2004 | Bhalakia | |
| 6,926,410 B2 | 8/2005 | Weber | |
| 6,939,499 B2 | 9/2005 | Merrill | |
| 7,019,905 B2 | 3/2006 | Weber | |
| 7,023,602 B2 | 4/2006 | Aastuen | |
| 7,077,985 B2 | 7/2006 | Maki | |
| 7,113,684 B1 * | 9/2006 | Cianciotto | G02B 6/0096 362/551 |
| 7,234,816 B2 | 6/2007 | Bruzzone | |
| 7,256,936 B2 | 8/2007 | Hebrink | |
| 7,316,558 B2 | 1/2008 | Merrill | |
| 7,329,006 B2 | 2/2008 | Aastuen | |
| 7,414,793 B2 * | 8/2008 | Cianciotto | 359/634 |
| 7,762,695 B2 * | 7/2010 | Lanczy | 362/368 |
| 8,057,056 B2 * | 11/2011 | Zhu et al. | 362/97.1 |
| 2002/0085393 A1 * | 7/2002 | Eisenman et al. | 362/576 |
| 2005/0212616 A1 * | 9/2005 | Lee et al. | 333/26 |
| 2007/0189016 A1 * | 8/2007 | Yamauchi et al. | 362/341 |
| 2008/0158889 A1 * | 7/2008 | Nagy | 362/307 |
| 2008/0239526 A1 * | 10/2008 | Takeda et al. | 359/833 |
| 2012/0320626 A1 * | 12/2012 | Quilici et al. | 362/606 |

FOREIGN PATENT DOCUMENTS

| | | | |
|---|---|---|---|
| JP | 11-2726 | 1/1999 | |
| JP | 11-025726 | 1/1999 | |
| JP | 11025726 * | 1/1999 | |
| JP | 2007-115417 | 5/2007 | |
| JP | 2007-188805 | 7/2007 | |
| JP | 2008-287920 | 11/2008 | |
| TW | 2013-23571 | 6/2013 | |
| WO | 99-47851 | 9/1999 | |
| WO | WO 2004001287 A1 * | 12/2003 | F21V 14/06 |
| WO | 2008-144136 | 11/2008 | |
| WO | 2008-144656 | 11/2008 | |
| WO | 2010-075357 | 7/2010 | |
| WO | WO 2012105314 A1 * | 8/2012 | |
| WO | 2012-138503 | 10/2012 | |
| WO | 2012-138595 | 10/2012 | |
| WO | 2013-062996 | 5/2013 | |

* cited by examiner

LIGHT DUCT TEE EXTRACTOR

RELATED APPLICATION

This application is related to the following U.S. Patent Application, which is incorporated by reference: "LIGHT DUCT TEE SPLITTER" Ser. No. 61/473,225, filed on an even date herewith.

BACKGROUND

The long-distance transport of visible light through a building can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported.

SUMMARY

The disclosure generally relates to highly efficient light duct light extractors that are capable of extracting a portion of the light propagating within a light duct with nearly 100 percent efficiency. In particular, the described light extractors are configured in a "Tee" shape with a reflective diverter element. In one aspect, the present disclosure provides a light duct extractor that includes a first light conduit defining a light transport cavity capable of transporting light along a first propagation direction, and a second light conduit defining a light diversion cavity, the second light conduit intersecting the first light conduit such that the light transport cavity and the light diversion cavity are contiguous. The light duct extractor further includes a light diverter extending between the light transport cavity and the light diversion cavity, the light diverter comprising a reflective surface disposed at a diverter angle to the first light propagation direction. A first light ray propagating within a collimation angle $\theta$ of the first propagation direction intercepting the reflective surface enters the second light conduit and is diverted to a second light ray propagating within the collimation angle $\theta$ of a second propagation direction in the second light conduit.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides a novel construction for a light extractor in a mirror-lined light duct. In one particular embodiment, the present disclosure addresses the ability to extract a portion of partially collimated light travelling through a light duct, with an efficiency of approximately 100%. The described light duct extractor can be generally applied to rectangular light ducts that intersect in a "Tee" configuration. In one particular embodiment, the light duct can be most effective by using very high efficiency mirrors such as, for example, Vikuiti™ Enhanced Specular Reflector (ESR) film available from 3M Company. In some cases, ESR film can be readily bent about a single axis of curvature, such as the curvatures common in rectangular cross-section light ducts.

Architectural daylighting using mirror-lined light ducts can deliver sunlight deep into the core of multi-floor buildings. Such mirror-lined light ducts can be uniquely enabled by the use of 3M optical films, including mirror films such as ESR film, that have greater than 98% specular reflectivity across the visible spectrum of light. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants.

In one particular embodiment, the light injected into the light duct is partially collimated light due to the method of light generation. This partially collimated light can generally be described as being included within a cone having border light rays within a collimation angle $\theta$ of the central light propagation direction.

In some cases, solar radiation can be collected and concentrated to be injected into the light duct. In some cases, artificial light from various sources can be injected into the light duct. Relatively well-collimated light can be more effectively used in mirror-lined duct systems for transporting light. For example, as sunlight is concentrated, the collimation angle will increase from the input collimation angle of sunlight, about ¼ degree half angle. Generally, the collimation angle $\theta$ of concentrated light, such as sunlight, passing into the light duct should be restricted to no greater than about 30 degrees, or no greater than about 25 degrees, or no greater than about 20 degrees, or even no greater than about 15 degrees. In one particular embodiment, the collimation angle $\theta$ can be about 18.4 degrees. The accuracy of tracking the sun, as well as the accuracy of the various optical components for injecting the light into the duct, all can contribute to the resulting collimation angle $\theta$.

Figure 1:
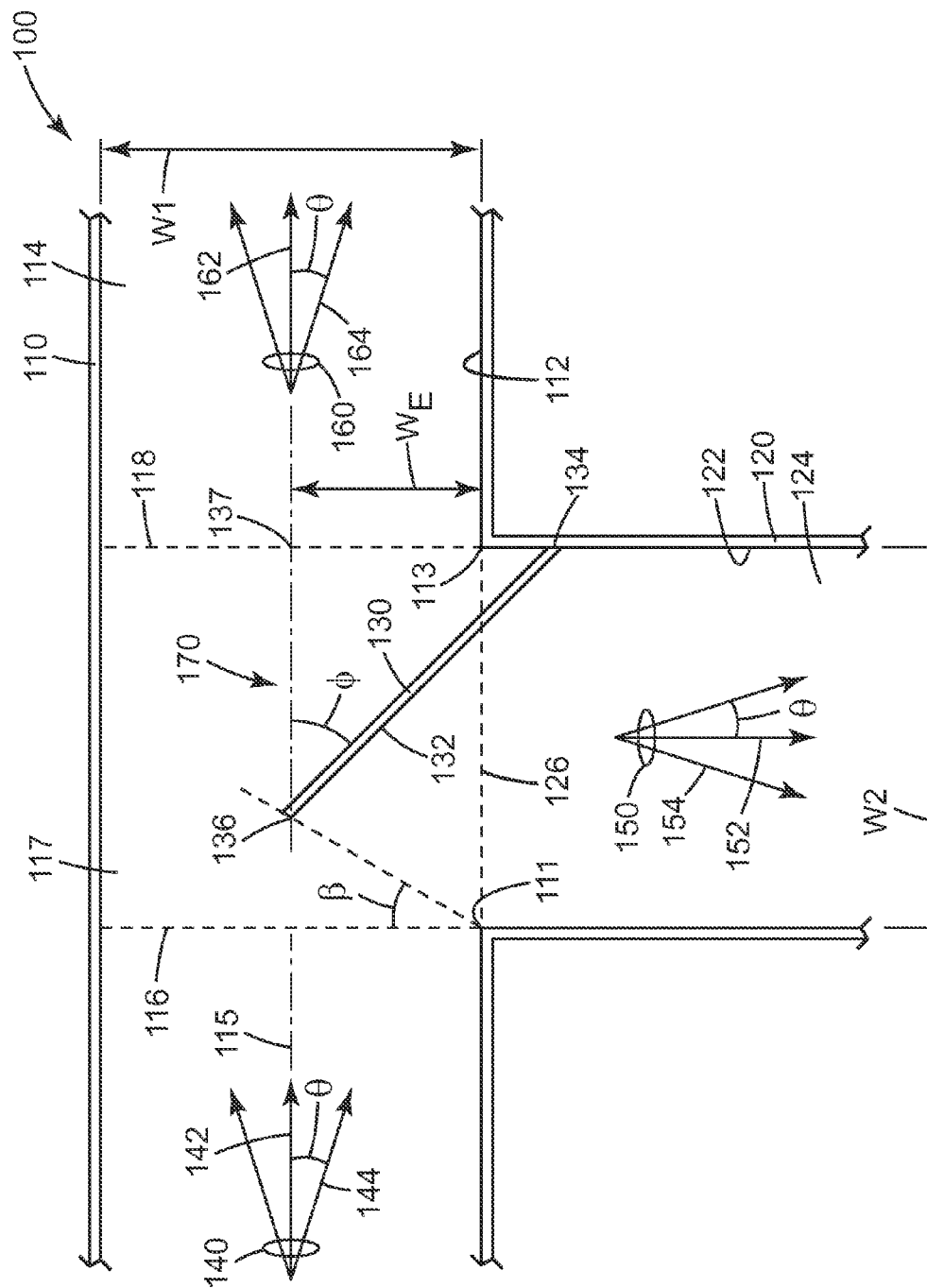
FIG. 1 shows a cross-sectional schematic of a light duct extractor.

FIG. 1 shows a cross-sectional schematic of a light duct extractor 100, according to one aspect of the disclosure. In one particular embodiment, light duct extractor 100 can be described as a light duct "Tee" extractor, since the light ducts intersect in a T-shape. Light duct extractor 100 includes a first light conduit 110 that defines a light transport cavity 114 that is capable of transporting an input light 140 along a first propagation direction 142. Light duct extractor 100 further includes a second light conduit 120 that defines a light diversion cavity 124 that is capable of transporting a diverted light 150 along a second propagation direction 152.

The second light conduit 120 intersects the first light conduit 110 such that the light transport cavity 114 and the light diversion cavity 124 are contiguous, and form a boxed region 117 defined by an input cross section 116 of the first light conduit 110, an output cross-section 118 of the first light conduit 110, and a diverter cross section 126 of the second light conduit 120. The boxed region 117 is further defined by a first corner 111 and a second corner 113 at an intersection of the first light conduit 110 and the second light conduit 120. The input cross section 116 and the output cross section 118 can have a first light conduit width W1 that is the same (or different), and the diverter cross section 126 can have a second light conduit width W2 that can be the same or different than the first light conduit width W1.

In one particular embodiment, first propagation direction 142 is located along the same direction as a central axis 115 of the first light conduit 110. Input light 140 is partially collimated light travelling along the first propagation direction 142, and includes light within a collimation angle $\theta$; that is, all of the input light 140 is included in a cone of light centered on the first propagation direction 142 and having boundary light rays 144 at the collimation angle $\theta$. In some cases, input light 140 can originate from sunlight which is collected and concentrated before being injected into the first light conduit 110. In some cases, input light can be "artificial light" generated by any known technique such as halogen lamps, arc lamps, light emitting diodes (LEDs), incandescent lamps, and the like.

A light diverter 170 extends between the light transport cavity 114 and the light diversion cavity 124. The light diverter 170 includes a reflector 130 having a reflective surface 132 disposed at a diverter angle $\phi$ to the first propagation direction 142. For Tee-shaped light ducts having light propagation directions along the axis of each duct that are orthogonal, the diverter angle $\phi$ is generally equal to 45 degrees. The light diverter 170 further includes a first edge 136 disposed in the boxed region 117 and a second edge 134 disposed in the light diversion cavity 124 outside the boxed region 117. In one particular embodiment, the second edge 134 can be immediately adjacent to the second light conduit 120. The first edge 136 of the light diverter 170 can be positioned at an extraction width $W_E$ that is some fraction of the first light conduit width W1. As can be seen in FIG. 1, the fraction of light that is extracted from the first light conduit 110 is approximately equal to (the extraction width $W_E$) divided by (the first light conduit width W1), for light that is uniformly distributed over the input cross section 116.

Light diverter 170 can be a planar reflector 130 as shown in FIG. 1, or it can be any shape that can redirect incident light. In one particular embodiment, light diverter 170 can be a triangular light diverter (not shown) that includes reflective surfaces positioned to form a right triangle with sides between the first edge 136, right-angle vertex 137, and second edge 134. In some cases, additional surfaces can provide, for example, support to the planar reflector 130, such as a reflector (not shown) positioned parallel to the first propagation direction and intersecting the first light conduit at second corner 113.

The preferred relationship between the collimation angle $\theta$ of the input light 140, the relative width of the first light conduit 110 and the second light conduit 120, the position of the first edge 136 (that is, angle $\beta$), the position of the second edge 134, and the fraction of light to be extracted ($W_E$/W1) for 100 percent light extraction efficiency can be calculated from the geometry of the system, as known to one of skill in the art. In one particular embodiment, the limiting relationship if first propagation direction 142 is perpendicular to second propagation direction 152 is given below, for $\theta<45$ degrees and $\beta \geq \theta$.

$$W_2 \geq W_E \left( \frac{1 + \tan(\beta)}{1 - \tan(\theta)} \right)$$

The light diverter 170 can then be positioned within the light duct extractor 100 such that, geometrically, 100 percent extraction efficiency can be achieved for any light within the collimation angle $\theta$ that intercepts the light diverter (reduced only by any small amount of absorbance or scattering from the highly efficient reflectors), as described elsewhere.

Generally, as described in the following FIGS. 2A-2C, input light 140 propagating within a collimation angle $\theta$ of the first propagation direction 142 that intersects the reflective surface 132 is diverted to a second light ray 150 propagating within the collimation angle $\theta$ of a second propagation direction 152 in the second light conduit 120. The input light 140 propagating within the collimation angle $\theta$ of the first propagation direction 142 that do not intersect the reflective surface 132, continue through the first light conduit 110 as third light rays 160 propagating within the collimation angle $\theta$ of the third propagation direction 162 in the first light conduit 110.

First and second light conduits 110, 120, and light diverter 170, can be fabricated from any material commonly used for architectural ductwork, including, for example sheet metals such as steel, galvanized sheet metals, aluminum, plastics and the like. All of the interior surfaces 112, 122, of first and second light conduits 110, 120, and reflective surface 132 of light diverter 170, are made from a material having a high specular reflectivity. A high specular reflectivity can enable efficient light transport along the considerable distances that can occur within architectural light ducts. In some embodiments, the highly specular reflectivity can be achieved using materials such as, for example, highly polished metals, metalized polymer films, and dielectric multilayer reflectors. In one particular embodiment, a multilayer optical film such as Vikuiti™ Enhanced Specular Reflector (ESR) film available from 3M Company can be a preferred material.

Figure 2A:
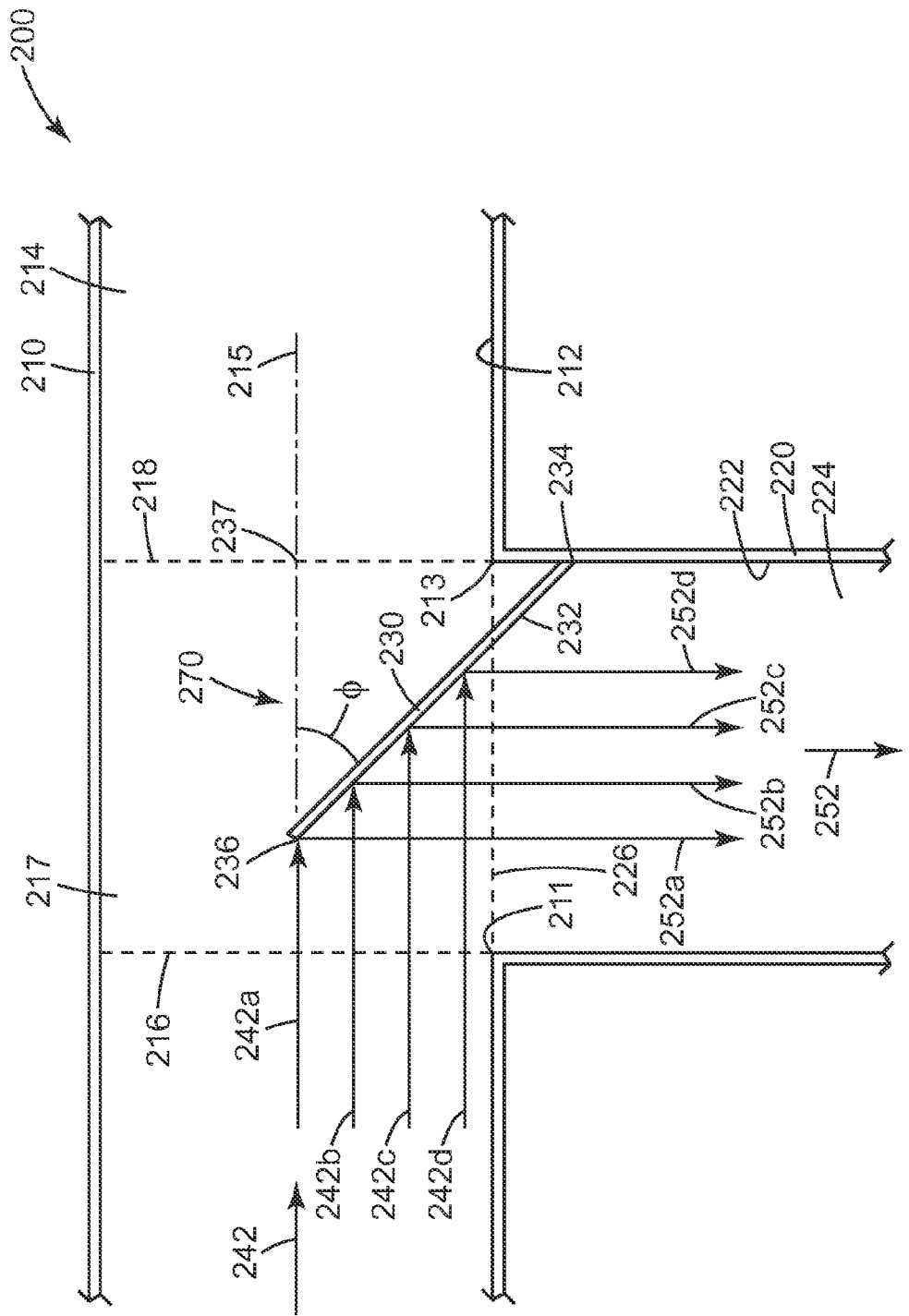
FIGS. 2A-2C show cross-sectional schematics of light paths through a light duct extractor.
Figure 2B:
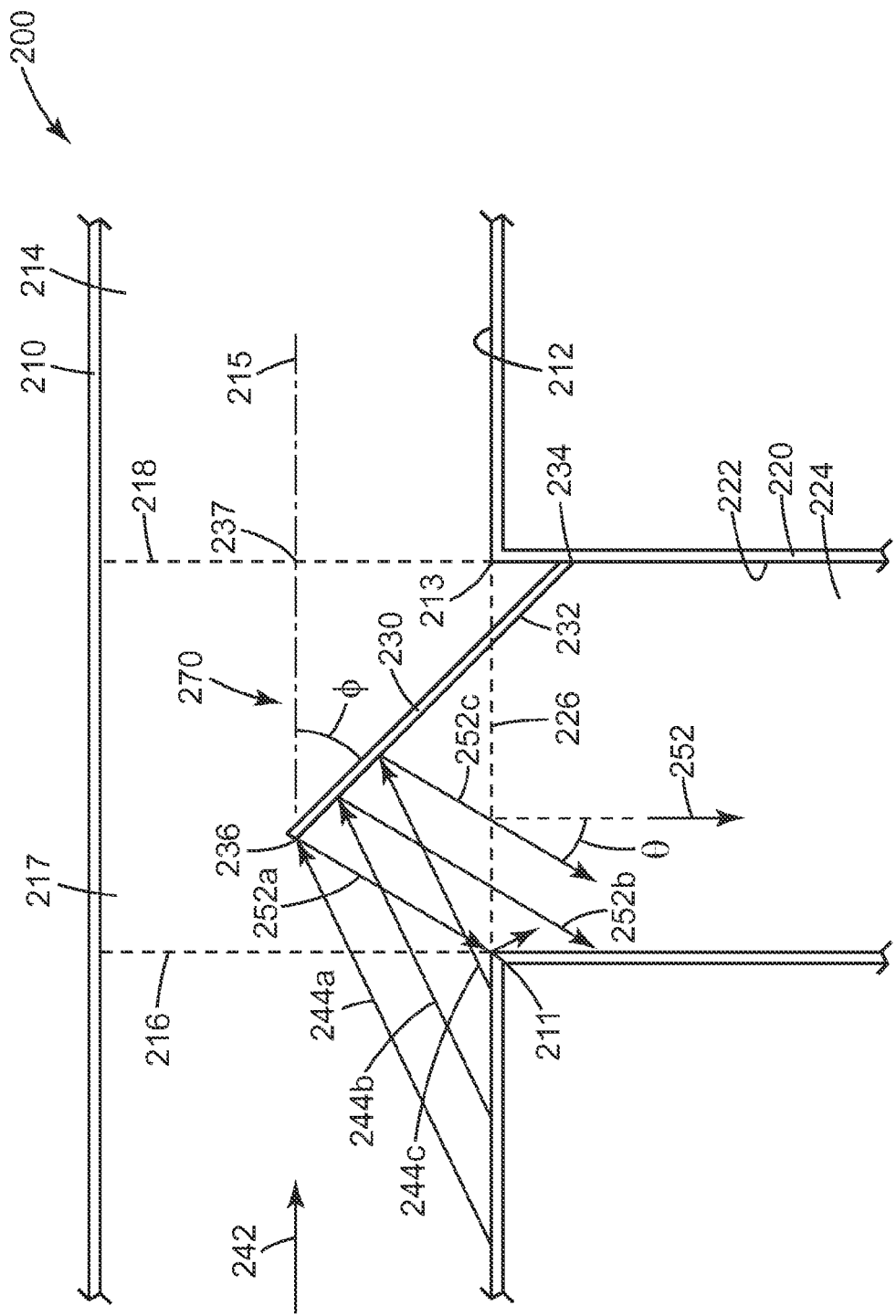
Figure 2C:
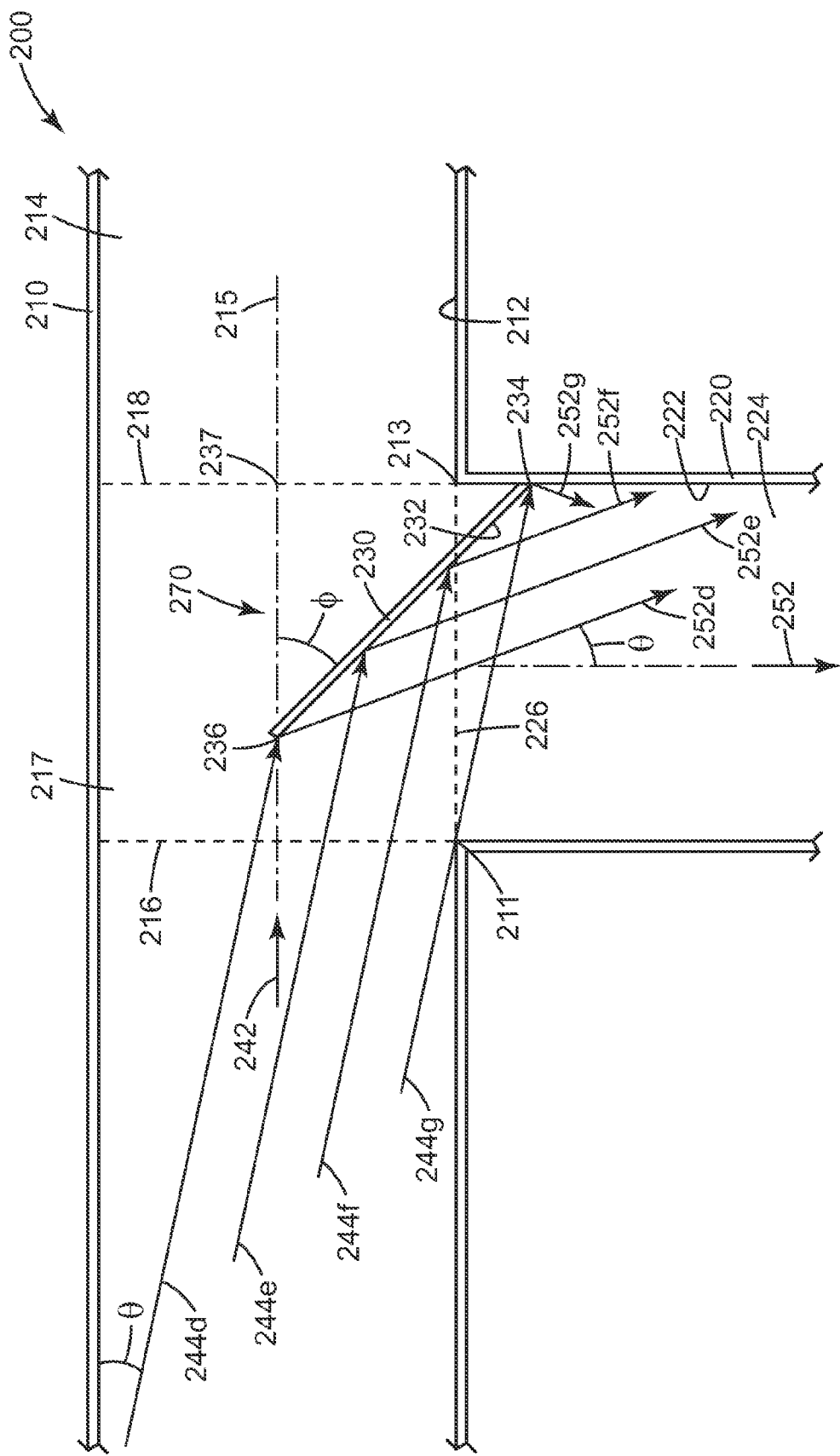

FIGS. 2A-2C show cross-sectional schematics of light paths through a light duct extractor 200, according to one aspect of the disclosure. Each of the elements 210-270 shown in FIGS. 2A-2C correspond to like-numbered elements 110-170 shown in FIG. 1, which have been described previously. For example, first light conduit 110 described with reference to FIG. 1 corresponds to a first light conduit 210 shown in FIGS. 2A-2C, and so on.

FIG. 2A shows a first through a fourth central first rays 242a, 242b, 242c, 242d that are propagating along the first propagation direction 242 of first light conduit 210. Each of the first through fourth central first rays 242a-242d intercept light diverter 270 and are reflected to become first through fourth central second rays 252a-252d propagating along second propagation direction 252. All of the central first light rays (that is, 242a-242d and all others parallel to them) propagating along the first propagation direction 242 that intercept reflector 230, are diverted to the central second light rays (that is, 252a-252d and all others parallel to them) propagating along the second propagation direction 252.

FIG. 2B shows a first through a third boundary first rays 244a, 244b, 244c that are propagating at the collimation angle $\theta$ to the first propagation direction 242 of first light conduit 210. Each of the first through third boundary first rays 244a-244c intercept light diverter 270 and are reflected to become first through third boundary second rays 254a-254c propagating at the collimation angle $\theta$ to second propagation direction 252. All of the boundary first light rays (that is, 244a-244c and all others parallel to them) propagating at the collimation angle $\theta$ to the first propagation direction 242 that intercept reflector 230, are diverted to the boundary second light rays (that is, 254a-254c and all others parallel to them) propagating at the collimation angle $\theta$ to the second propagation direction 252.

Of particular interest in FIG. 2B is the path of the first boundary first ray 244a, which is shown to intercept reflector 230 at first edge 236, and is reflected to first corner 211. First boundary first ray 244a provides a relationship for the position of first edge 236 within boxed region 217, for a given collimation angle θ. In one case, for example, any extension of reflector 230 beyond first edge 236 would decrease the efficiency of extraction, since some of the light incident to reflector 230 would then be reflected back to the first light conduit 210. In another case, for example, a change in diverter angle θ may change the position of first edge 236, in order to direct incident light efficiently down second light conduit 220.

FIG. 2C shows a fourth through a seventh boundary first rays 244d, 244e, 244f, 244g, that are propagating at the collimation angle θ to the first propagation direction 242 of first light conduit 210. Each of the fourth through seventh boundary first rays 244d-244g intercept light diverter 270 and are reflected to become fourth through seventh boundary second rays 254d-254g propagating at the collimation angle θ to second propagation direction 252. All of the boundary first light rays (that is, 244d-244g and all others parallel to them) propagating at the collimation angle θ to the first propagation direction 242 that intercept reflector 230, are diverted to the boundary second light rays (that is, 254d-254g and all others parallel to them) propagating at the collimation angle θ to the second propagation direction 252.

Of particular interest in FIG. 2C is the path of the seventh boundary first rays 244g, which is shown to just pass by first corner 211 to intercept reflector 230 at second edge 234, and is reflected at collimation angle θ then almost instantly reflects again off interior surface 222 to collimation angle −θ relative to the second propagation direction 252. Seventh boundary first ray 244g provides a relationship for the position of second edge 234 within light duct extractor 200, for a given collimation angle θ. In one case, for example, any reduction in the length of reflector 230 (that is, shortening such that the second edge 234 is moved away from second light conduit 220) would decrease the efficiency of extraction, since some of the light rays entering the second light conduit 220 would not intercept the reflector 230 and would not be reflected to within the collimation angle θ of the second propagation direction 252.

Figure 3:
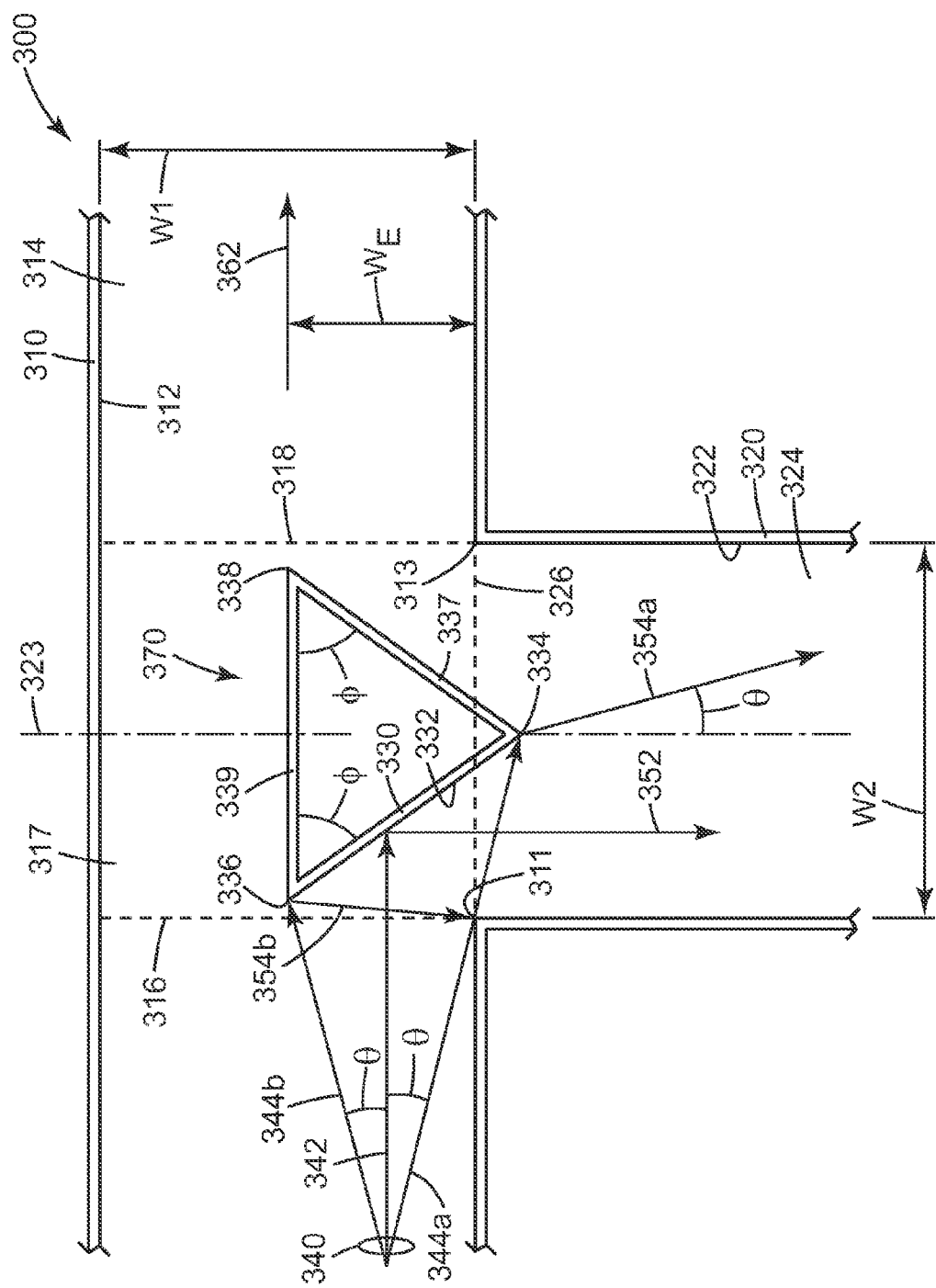
FIG. 3 shows a light duct extractor.

FIG. 3 shows a light duct extractor 300, according to one aspect of the disclosure. Each of the elements 310-370 shown in FIG. 3 correspond to like-numbered elements 110-170 shown in FIG. 1, which have been described previously. For example, first light conduit 110 described with reference to FIG. 1 corresponds to a first light conduit 310 shown in FIG. 3, and so on. In FIG. 3, however, light diverter 370 is in the shape of an isosceles right triangle having a first, a second, and a third reflector 330, 337, 339. Light diverter 370 can be used to extract light travelling in both directions within first light conduit 310. In some cases, this may be useful in architectural lighting systems that include artificial and natural light sources that may be located in different portions of a building, along different portions of the light duct.

The geometrical considerations of each of the first and second reflectors 330, 337, are similar to those provided for in reference to FIGS. 2A-2C. The relative positioning of the first reflector 330 can be determined by the paths of first light rays 340 including central light ray travelling at the first propagation direction 342, and first and second boundary light rays 344a, 344b travelling through first light conduit 310 at the collimation angle θ to first propagation direction 342.

As shown in FIG. 3, first boundary light ray 344a passes by first corner 311 of the intersection of the first and second light conduit 310, 320, intersects second edge 334 of first reflector 330 of light diverter 370, and is diverted to first boundary second light ray 354a propagating within collimation angle θ of second propagation direction 352. Second boundary light ray 344b intersects first edge 336 of first reflector 330 of light diverter 370, is diverted to reflect from first corner 311 of the intersection of the first and second light conduits 310, 320, and is diverted to second boundary second light ray 354b propagating within collimation angle θ of second propagation direction 352. In order to maintain high efficiency within the collimation range, either the width of diverter duct W2 may increase or the collimation angle θ may decrease relative to the single direction case shown in FIGS. 1-2. For example, to achieve the same extraction ($W_E$) and collimation angle θ the width W2 must double for the bi-directional case of FIG. 3 relative to the single direction case of FIGS. 1-2.

Following are a list of embodiments of the present disclosure.

Item 1 is a light duct extractor, comprising: a first light conduit defining a light transport cavity capable of transporting light along a first propagation direction; a second light conduit defining a light diversion cavity, the second light conduit intersecting the first light conduit such that the light transport cavity and the light diversion cavity are contiguous; and a light diverter extending between the light transport cavity and the light diversion cavity, the light diverter comprising a reflector disposed at a diverter angle to the first light propagation direction, wherein a first light ray propagating within a collimation angle θ of the first propagation direction intercepting the reflective surface enters the second light conduit and is diverted to a second light ray propagating within the collimation angle θ of a second propagation direction in the second light conduit.

Item 2 is the light duct extractor of item 1, wherein the diverter angle comprises an angle of approximately 45 degrees, and the first propagation direction and the second propagation direction are perpendicular.

Item 3 is the light duct extractor of item 1 or item 2, wherein each of the first and second light conduits include a first and a second rectangular cross-section, respectively.

Item 4 is the light duct extractor of item 3, wherein each of the first and second rectangular cross-sections are the same.

Item 5 is the light duct extractor of item 1 to item 4, wherein the light diverter comprises a planar reflector.

Item 6 is the light duct extractor of item 5, wherein the planar reflector comprises a first edge disposed within a region bounded by the intersection of the light transport cavity and the light diversion cavity.

Item 7 is the light duct extractor of item 1 to item 6, wherein the light diverter comprises a triangular reflector.

Item 8 is the light duct extractor of item 7, wherein the triangular reflector comprises: a first side disposed within a region bounded by the intersection of the light transport cavity and the light diversion cavity, the first side positioned parallel to the first light propagation direction; and a first edge formed by the intersection of the first side and the reflective surface, wherein the first edge is disposed within a region bounded by the intersection of the light transport cavity and the light diversion cavity.

Item 9 is the light duct extractor of item 1 to item 8, wherein the collimation angle is between about 0 degrees and about 30 degrees.

Item 10 is the light duct extractor of item 1 to item 9, wherein the collimation angle is between about 10 degrees and about 20 degrees.

Item 11 is the light duct extractor of item 1 to item 10, wherein the collimation angle is about 18.4 degrees.

Item 12 is the light duct extractor of item 1 to item 11, wherein a first edge of the light diverter is disposed within a boxed region defined by an input cross section of the first light conduit, an output cross-section of the first light conduit, and a diverter cross-section of the second light conduit.

Item 13 is the light duct extractor of item 12, wherein a second edge of the light diverter is disposed in the light diversion cavity outside of the boxed region.

Item 14 is the light duct extractor of item 12 or item 13, wherein the light diverter comprises a triangular reflector having a first side disposed in the boxed region parallel to the first propagation direction, and an apex disposed in the light diversion cavity outside of the boxed region.

Item 15 is the light duct extractor of item 12 to item 14, wherein the light diverter comprises an isosceles-shaped triangular reflector having a base disposed in the boxed region parallel to the first propagation direction, and an apex centered in the light diversion cavity outside of the boxed region.

Item 16 is the light duct extractor of item 12 to item 15, wherein at least two of the input cross section of the first light conduit, the output cross-section of the first light conduit, and the input cross-section of the second light conduit have the same dimensions.

Item 17 is the light duct extractor of item 12 to item 16, wherein the input cross-section of the second light conduit is smaller than the input cross-section of the first light conduit.

Item 18 is the light duct extractor of item 1 to item 17, wherein the diverter angle and the reflective surface extending into the light transport cavity can be independently adjusted so that a variable portion of light travelling though the light transport cavity can be diverted to the light diversion cavity.

Item 19 is the light duct extractor of item 1 to item 18, wherein the first propagation direction and the second propagation are perpendicular to each other.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light duct extractor, comprising:
   a first light conduit defining a light transport cavity capable of transporting light along a first propagation direction, wherein the first light conduit comprises a first rectangular cross-section;
   a second light conduit defining a light diversion cavity, the second light conduit intersecting the first light conduit such that the light transport cavity and the light diversion cavity are contiguous, wherein the second light conduit comprises a second rectangular cross-section; and
   a light diverter extending between the light transport cavity and the light diversion cavity, the light diverter comprising a reflective surface disposed at a diverter angle to the first propagation direction, wherein a first edge of the light diverter is disposed within a boxed region defined by an input cross section of the first light conduit, an output cross-section of the first light conduit, and a diverter cross section of the second light conduit, and wherein a second edge of the light diverter is disposed in the light diversion cavity outside of the boxed region;
   wherein a first light ray propagating within a collimation angle of the first propagation direction intercepting the reflective surface, enters the second light conduit and is diverted to a second light ray propagating within the collimation angle of a second propagation direction in the second light conduit.

2. The light duct extractor of claim 1, wherein the diverter angle comprises an angle of approximately 45 degrees, and the first propagation direction and the second propagation direction are perpendicular.

3. The light duct extractor of claim 1, wherein each of the first and second rectangular cross-sections are the same.

4. The light duct extractor of claim 1, wherein the light diverter comprises a planar reflector.

5. The light duct extractor of claim 1, wherein the collimation angle is between about 0 degrees and about 30 degrees.

6. The light duct extractor of claim 1, wherein the collimation angle is between about 10 degrees and about 20 degrees.

7. The light duct extractor of claim 1, wherein the collimation angle is between about 15 degrees and about 20 degrees.

8. The light duct extractor of claim 1, wherein at least two of the input cross section of the first light conduit, the output cross-section of the first light conduit, and the input cross section of the second light conduit have the same dimensions.

9. The light duct extractor of claim 1, wherein the diverter angle and a position of the reflective surface extending into the light transport cavity can be independently selected such that a predetermined portion of light travelling though the light transport cavity diverts to the light diversion cavity.

10. The light duct extractor of claim 1, wherein the first propagation direction and the second propagation direction are perpendicular to each other.

11. A light duct extractor, comprising:
    a first light conduit defining a light transport cavity, wherein the first light cavity transports light along a first propagation direction;
    a second light conduit defining a light diversion cavity, the second light conduit intersecting the first light conduit such that the light transport cavity and the light diversion cavity are contiguous; and
    a light diverter extending between the light transport cavity and the light diversion cavity, wherein the light diverter comprises a triangular reflector having a first side within a boxed region defined by an input cross section of the first light conduit, an output cross-section of the first light conduit, and a diverter cross section of the second light conduit, the first side positioned parallel to the first propagation direction, wherein the triangular reflector comprises a reflective surface disposed at a diverter angle with respect to the first propagation direction; and
    a first edge formed by the intersection of the first side and the reflective surface, wherein the first edge is disposed within boxed region, and a second edge formed by the intersection of the reflective surface and a second side, and wherein the second edge is disposed outside the boxed region, wherein a first light ray propagating within a collimation angle θ of the first propagation direction intercepting the reflective surface of the triangular reflector enters the second light conduit and is diverted to a second light ray propagating within the collimation angle θ of a second propagation direction in the second light conduit.

12. The light duct extractor of claim 11, wherein the triangular reflector comprises an isosceles-shaped triangular reflector having a base disposed in the boxed region and parallel to the first propagation direction, and an apex centered in the light diversion cavity outside of the boxed region.

13. The light duct extractor of claim 11, wherein at least two of the input cross section of the first light conduit, the output cross-section of the first light conduit, and the input cross section of the second light conduit have the same dimensions.

14. The light duct extractor of claim 11, wherein the diverter angle of the reflective surface of the triangular reflector, a position of the first edge, and a position of the second edge are independently selected such that a predetermined portion of light travelling though the light transport cavity diverts into the light diversion cavity.

* * * * *